(12) United States Patent
Nishiyama et al.

(10) Patent No.: US 6,901,746 B2
(45) Date of Patent: Jun. 7, 2005

(54) EXHAUST GAS DENOX APPARATUS FOR ENGINE

(75) Inventors: Toshihiko Nishiyama, Oyama (JP); Koutaro Wakamoto, Oyama (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 10/658,401

(22) Filed: Sep. 10, 2003

(65) Prior Publication Data

US 2004/0045280 A1 Mar. 11, 2004

Related U.S. Application Data

(62) Division of application No. 10/043,311, filed on Jan. 14, 2002, now Pat. No. 6,681,564.

(30) Foreign Application Priority Data

Feb. 5, 2001 (JP) .................................... 2001-027621

(51) Int. Cl.[7] .............................................. F01N 3/00
(52) U.S. Cl. ............................. 60/285; 60/278; 60/280; 60/295; 123/568.2
(58) Field of Search .................... 60/276, 278, 280, 60/285, 297, 295; 123/568.2; 251/149

(56) References Cited

U.S. PATENT DOCUMENTS

| | | | |
|---|---|---|---|
| 5,172,550 A | 12/1992 | Takeshima | |
| 5,551,408 A | * 9/1996 | Shimizu et al. | ............. 123/679 |
| 5,564,283 A | 10/1996 | Yano et al. | |
| 5,732,554 A | 3/1998 | Sasaki et al. | |
| 5,826,427 A | 10/1998 | Yanagihara et al. | |
| 6,101,999 A | 8/2000 | Ohashi et al. | |
| 6,105,365 A | * 8/2000 | Deeba et al. | ................. 60/274 |
| 6,109,025 A | 8/2000 | Murata et al. | |
| 6,134,883 A | * 10/2000 | Kato et al. | ................... 60/274 |
| 6,279,552 B1 | * 8/2001 | Okada et al. | ............ 123/568.2 |
| 6,330,880 B1 | * 12/2001 | Okada et al. | ............ 123/568.2 |
| 6,681,564 B2 | * 1/2004 | Nishiyama et al. | ........... 60/285 |
| 6,697,729 B2 | * 2/2004 | Wright | ....................... 701/104 |

FOREIGN PATENT DOCUMENTS

JP  7-279218  10/1995

* cited by examiner

*Primary Examiner*—Tu M. Nguyen
(74) *Attorney, Agent, or Firm*—Rader, Fishman & Grauer PLLC

(57) ABSTRACT

An exhaust gas deNOx apparatus, which can make an NOx adsorber catalyst compact and does not impair reliability of an engine, is provided. To this end, the apparatus is provided with an NOx adsorber catalyst for adsorbing and releasing NOx, an exhaust gas recirculating circuit for mixing an exhaust gas into intake air, and an exhaust gas recirculating circuit adjusting valve and controller for recirculating a predetermined amount of the exhaust gas for reducing NOx when the adsorbed NOx accumulation amount is a predetermined value or less, and recirculating the aforementioned predetermined amount or more of exhaust gas to bring an air fuel ratio into a rich state when the adsorbed NOx accumulation amount exceeds a predetermined value and is to be released.

12 Claims, 13 Drawing Sheets

F I G. 1 1
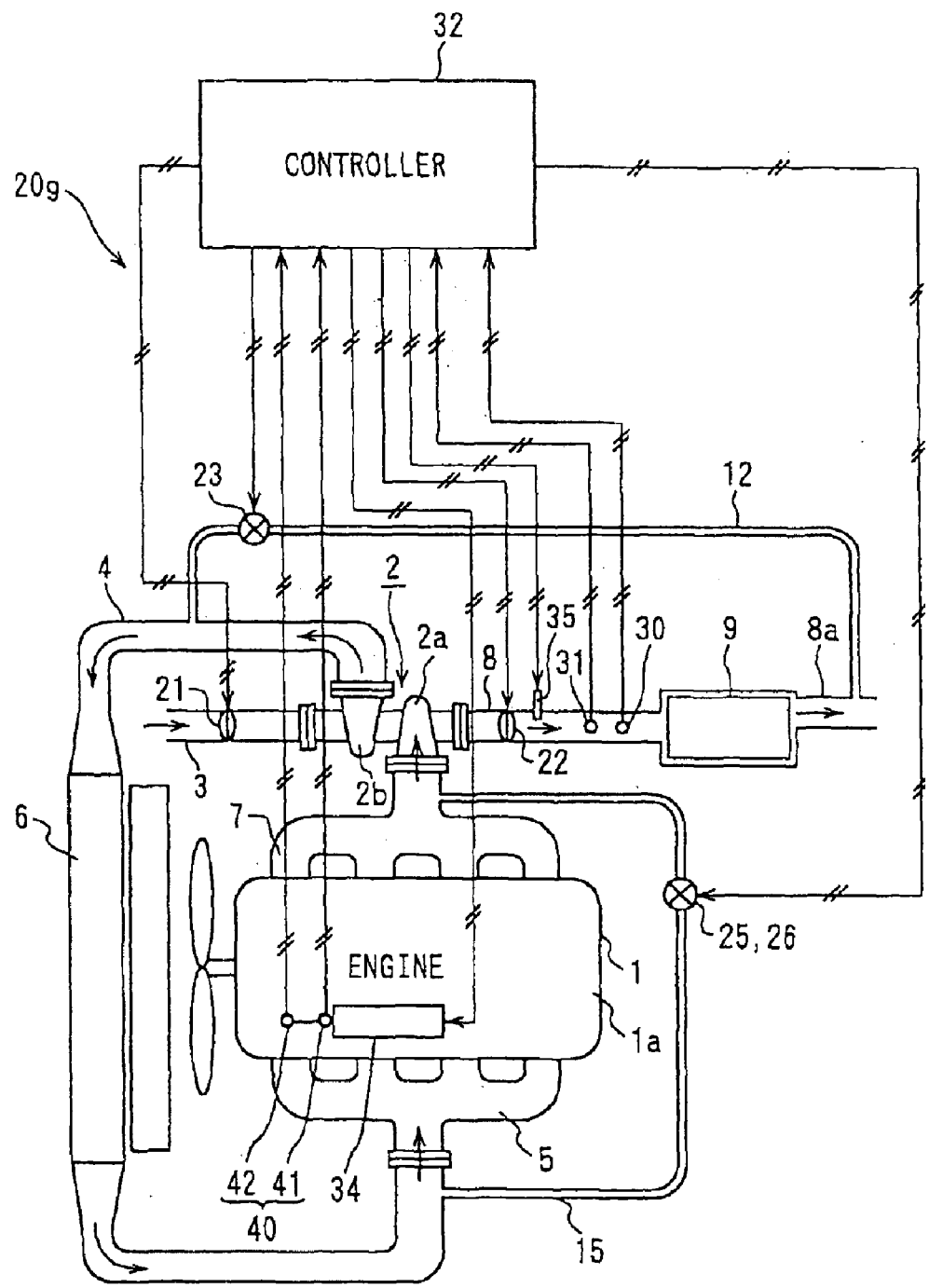

F I G. 1 3
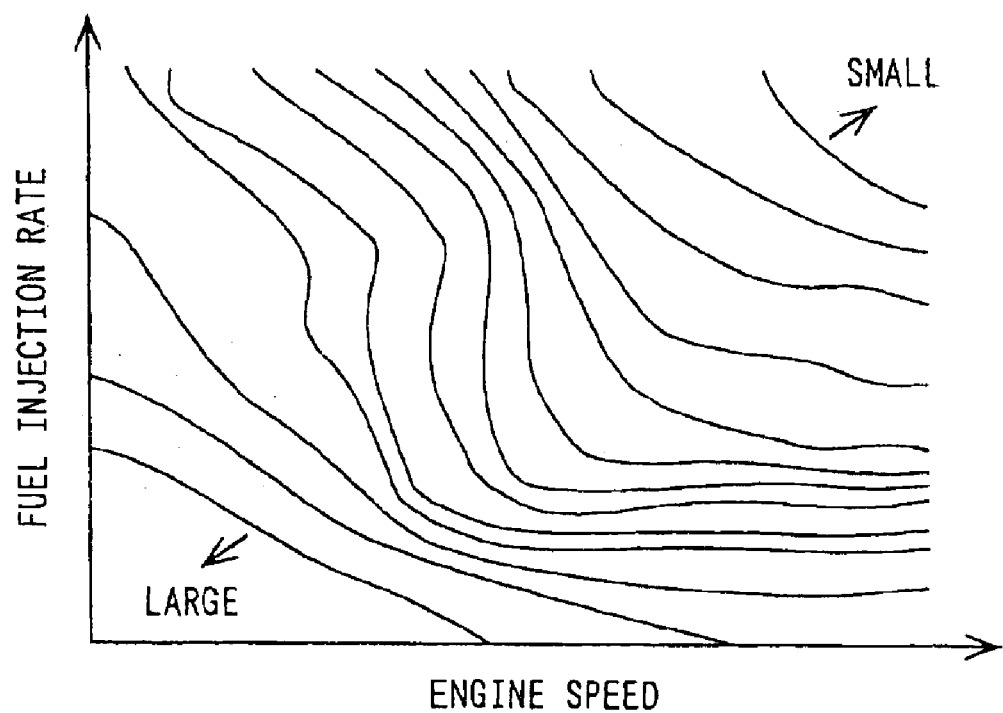

US 6,901,746 B2

EXHAUST GAS DENOX APPARATUS FOR ENGINE

RELATED APPLICATION

This application is a divisional application of application Ser. No. 10/043,311 filed on Jan. 14, 2002, now U.S. Pat. No. 6,681,564.

TECHNICAL FIELD

The present invention relates to an exhaust gas deNOx apparatus for an engine, and particularly, it relates to an exhaust gas deNOx apparatus for a diesel engine.

BACKGROUND ART

Various contrivances are conventionally proposed regarding an exhaust gas deNOx apparatus for a diesel engine, and one disclosed in Japanese Patent Application Laid-open No. 7-279718 is cited as an example thereof.

According to Japanese Patent Application Laid-open No. 7-279718, an NOx adsorber is placed in an exhaust passage of an engine, and an exhaust gas recirculating (EGR) circuit having an EGR control valve for controlling an amount of flowing exhaust gas is provided. The NOx adsorber absorbs NOx in a normal condition, and it releases NOx when an air fuel ratio inside a combustion chamber becomes rich, and reduces NOx by CO and HC. When the air fuel ratio inside the combustion chamber is to be made rich, the EGR control valve is opened to allow exhaust gas to recirculate, an amount of intake air is decreased, and injection fuel is increased to thereby make the air fuel ratio rich. At the same time, a fuel injection amount is further increased so that engine output torque does not change.

However, in the above-described constitution, a large amount of NOx is contained in exhaust gas because the EGR control valve is closed during normal operation, and therefore it is necessary to increase the size of the NOx adsorber, which makes a space area larger in the case of a large-sized engine, thus causing the constitutional disadvantage, and also causing the disadvantage of cost being high. In addition, when fuel is increased under a heavy load, there arises the fear that inner pressure of cylinders and exhaust gas temperature are increased and reliability and durability of the engine are impaired.

SUMMARY OF THE INVENTION

The present invention is made in view of the above-described disadvantages, and its object is to provide an exhaust gas deNOx apparatus for an engine at low cost, which can reduce an NOx adsorber catalyst in size without impairing reliability and durability of an engine.

In order to attain the above object, an exhaust gas deNOx apparatus for an engine according to the present invention is an exhaust gas deNOx apparatus for an engine comprising an NOx adsorber catalyst in an exhaust pipe line of an engine, for adsorbing NOx when an air fuel ratio of an exhaust gas flowing therein is in a lean state and releasing NOx when the air fuel ratio of the exhaust gas flowing therein is in a rich state, and an exhaust gas recirculaing circuit for mixing the exhaust gas into intake air, and has the constitution provided with exhaust gas recirculating amount control means for recirculating a predetermined amount of exhaust gas for reducing NOx when an adsorbed NOx accumulation amount is not more than a predetermined value, and recirculating the predetermined amount or more of exhaust gas to bring the air fuel ratio into a rich state when the adsorbed NOx accumulation amount exceeds the predetermined value and the NOx is to be released.

According to the above constitution, a predetermined amount (for example, 10% to 15% of the exhaust gas amount) of exhaust gas can be recirculated when the air fuel ratio of the exhaust gas of the engine is in a lean state, and therefore NOx in the exhaust gas can be reduced in a normal lean-burn state. In addition, since the exhaust gas recirculating amount control means is provided, the exhaust gas recirculating amount can be adjusted to the amount that can optimize emission, and the NOx adsorber catalyst can be made compact, thus reducing a space area to make the engine compact.

Further, in the exhaust gas deNOx apparatus for the engine, the exhaust gas recirculating amount control means has the constitution in which it is able to adjust an exhaust gas recirculating amount, which is fed when the air fuel ratio of the exhaust gas flowing into the NOx adsorber catalyst is brought into a rich state, so that an excess air ratio is more than 1.0 and is about 1.3 or less.

According to the above constitution, the exhaust gas recirculating amount control means that can make the exhaust gas recirculating amount have the excess air ratio of 1.0 to about 1.3 is provided. As a result, the air fuel ratio of the exhaust gas is brought into a rich state, whereby NOx can be released and reduced, a large amount of fuel as a reducer does not have to be sprayed, and fuel consumption rate can be prevented from changing for the worse. The excess air ratio is "1" when the air fuel ratio is a theoretical mixture ratio. The rich state means the state in which the air fuel ratio is near the theoretical mixture ratio, and the lean state corresponds to the state in which the air fuel ratio is larger than in the rich state, but the excess air ratio corresponding to each state differs according to the kind of the engine. When the above-described exhaust gas recirculating amount is to be adjusted, the oxygen concentration in the exhaust gas is converted into air with the oxygen concentration of about 20%, the converted air is regarded as part of the intake air amount and fresh air is added thereto, which is made the total air amount.

Further, in the exhaust gas deNOx apparatus for the engine, the exhaust gas recirculating amount control means comprises
at least any one of an intake air throttle valve free to be opened and closed, which is provided in a pipe line of an intake pipe of the engine, and an exhaust gas throttle valve free to be opened and closed, which is provided in a pipe line of an exhaust pipe of the engine, and a controller, and
the controller outputs a control signal to decrease degree of opening of either one of the intake air throttle valve or the exhaust gas throttle valve when the air fuel ratio of the exhaust gas is to be brought into a rich state.

According to the above constitution, by decreasing the degree of opening of the throttle valve provided in the exhaust gas pipe line or the intake air pipe line, the supply air pressure can be easily lowered more sharply than the exhaust gas pressure. As a result, a large amount of exhaust gas is recirculated and thereby the air fuel ratio of the exhaust gas can be made rich, which makes it possible to reduce a space area and cost with the simple structure.

Further, in the exhaust gas deNOx apparatus for the engine, the exhaust gas recirculating circuit comprises a first exhaust gas recirculating circuit and at least one second exhaust gas recirculating circuit provided in parallel with the first exhaust gas recirculating circuit, the exhaust gas recirculating amount control means comprises a second recirculating circuit adjusting valve free to be opened and closed, which is provided in the second exhaust gas recirculating circuit, NOx amount detection means for detecting an NOx amount, and a controller for calculating an NOx accumulation amount in the NOx adsorber catalyst based on the NOx amount outputted from the NOx amount detection means and determining whether the calculated NOx accumulation amount is a predetermined value or less, or not, and when the calculated NOx accumulation amount exceeds the predetermined value, the controller outputs a control signal to open the second recirculating circuit adjusting valve to make the air fuel ratio of the exhaust gas of the engine rich.

According to the above constitution, the exhaust gas is recirculated only in the first exhaust gas recirculating circuit when the air fuel ratio is lean. On the other hand, when the air fuel ratio is made rich, the second exhaust gas recirculating circuit is also used, and therefore a large amount of exhaust gas can be recirculated with less resistance. As a result, the performance is improved, and the second recirculating circuit adjusting valve is made an ON-OFF valve with a simple structure, thus making it possible to reduce cost.

In the exhaust gas deNOx apparatus for the engine, the exhaust gas recirculating circuit comprises a third exhaust gas recirculating circuit provided with a plurality of recirculating circuit adjusting valves in parallel, the exhaust gas recirculating amount control means comprises the plurality of recirculating circuit adjusting valves, NOx amount detection means for detecting an NOx amount, and a controller for calculating an NOx accumulation amount in the NOx adsorber catalyst based on the NOx amount outputted from the NOx amount detection means and determining whether the calculated NOx accumulation amount is a predetermined value or less, or not, and when the calculated NOx accumulation amount exceeds a predetermined value, the controller outputs a control signal to increase a total opening area of the plurality of recirculating circuit adjusting valves to be larger than that in a lean state and makes the air fuel ratio of the exhaust gas of the engine rich.

According to the above constitution, with only one exhaust gas recirculating circuit, fine adjustment is facilitated by making the first recirculating circuit adjusting valve compact when the air fuel ratio is lean, and thus emission can be optimized. When the air fuel ratio is to be made rich, the second recirculating circuit adjusting valve is opened to make the total opening area larger, whereby a large amount of exhaust gas can be recirculated. In addition, an ON-OFF valve can be used as the second recirculating circuit adjusting valve, which is simple in structure, and the engine can be constituted to be compact, which can make the cost lower.

Further, in the exhaust gas deNOx apparatus for the engine, a turbocharger is provided at the engine, and the exhaust gas recirculating amount control means comprises an air bleed valve free to be opened and closed, which is provided at an outlet port of a compressor of the turbocharger, and extracts supply air to an outside, and a controller for outputting a control signal to open the air bleed valve when the air fuel ratio of the exhaust gas of the engine is to be made rich.

According to the above constitution, by opening the air bleed valve provided at the outlet port of the compressor of the turbocharger, the supply air pressure can be more sufficiently reduced than the exhaust gas pressure. Accordingly, a large amount of exhaust gas can be recirculated.

Furthermore, in the exhaust deNOx apparatus for the engine, the exhaust gas recirculating amount control means comprises fuel supply means for supplying fuel into at least one of cylinders of the engine and an exhaust pipe of the engine, when the air fuel ratio of the exhaust gas is brought into a rich state, the fuel supply means supplies fuel as an adjustment amount to provide an air fuel ratio that allows the NOx adsorber catalyst to release and reduce NOx.

According to the above constitution, when the air fuel ratio is to be made rich, fuel is supplied to adjust an insufficient amount. As a result, the air fuel ratio can be surely controlled to be near the theoretical air fuel ratio. Further, since a large amount of recirculating exhaust gas is circulated, supply amount of fuel can be reduced, which is economical and can prevent the inner pressure of the cylinders and exhaust gas temperature from excessively rising, and thus the air fuel ratio can be made rich without reducing reliability and durability of the engine.

In the exhaust gas deNOx apparatus for the engine, the exhaust gas recirculating amount control means includes load detection means for detecting a load of the engine, and a controller, and the controller inputs a detection signal from the load detection means, and when the detected load is a predetermined value or less, it brings the air fuel ratio of the exhaust gas into a rich state.

According to the above constitution, when the engine is operated under a lighter load than a predetermined load, that is, in a light load range, the means for making the air fuel ratio rich is operated. Since the engine is under a light load, added fuel can be reduced, which is economical and can prevent the inner pressure of the cylinders and the exhaust gas temperature from excessively rising and the like, and the frequency of addition of fuel in a high load range is decreased, thus making it possible to improve reliability and durability of the engine.

Further, in the exhaust gas deNOx apparatus for the engine, the exhaust gas recirculating amount control means comprises a variable turbocharger provided at the engine, for making a degree of opening of a turbine passage variable, and a controller, and when the air fuel ratio is to be brought into a rich state, the controller outputs a control signal to decrease the degree of opening of the turbine passage.

According to the above constitution, the degree of opening of the turbine passage is made small, for example, the degree of opening is made extremely small, whereby the exhaust gas pressure at the exhaust gas turbine inlet port can be made higher than the supply air pressure at the compressor outlet port of the variable turbocharger. Then, this pressure difference between the supply air and exhaust gas is utilized to allow a required amount of exhaust gas to flow into the supply air. Accordingly, with use of the variable turbocharger, the same effects as the exhaust gas throttle valve can be also obtained.

BRIEF DESCRIPTION OF THE DRAWINGS

FIG. 11 is a conceptual diagram of an exhaust gas deNOx apparatus for an engine of an eighth embodiment of the present invention;

FIG. 13 is a diagram showing relationship between discharged NOx amount, and fuel injection rate and engine speed according to a tenth embodiment of the present invention.

BEST MODE FOR CARRYING OUT THE INVENTION

Preferred embodiments of an exhaust gas deNOx apparatus for an engine according to the present invention will be explained in detail below with reference to the drawings.

Figure 1:
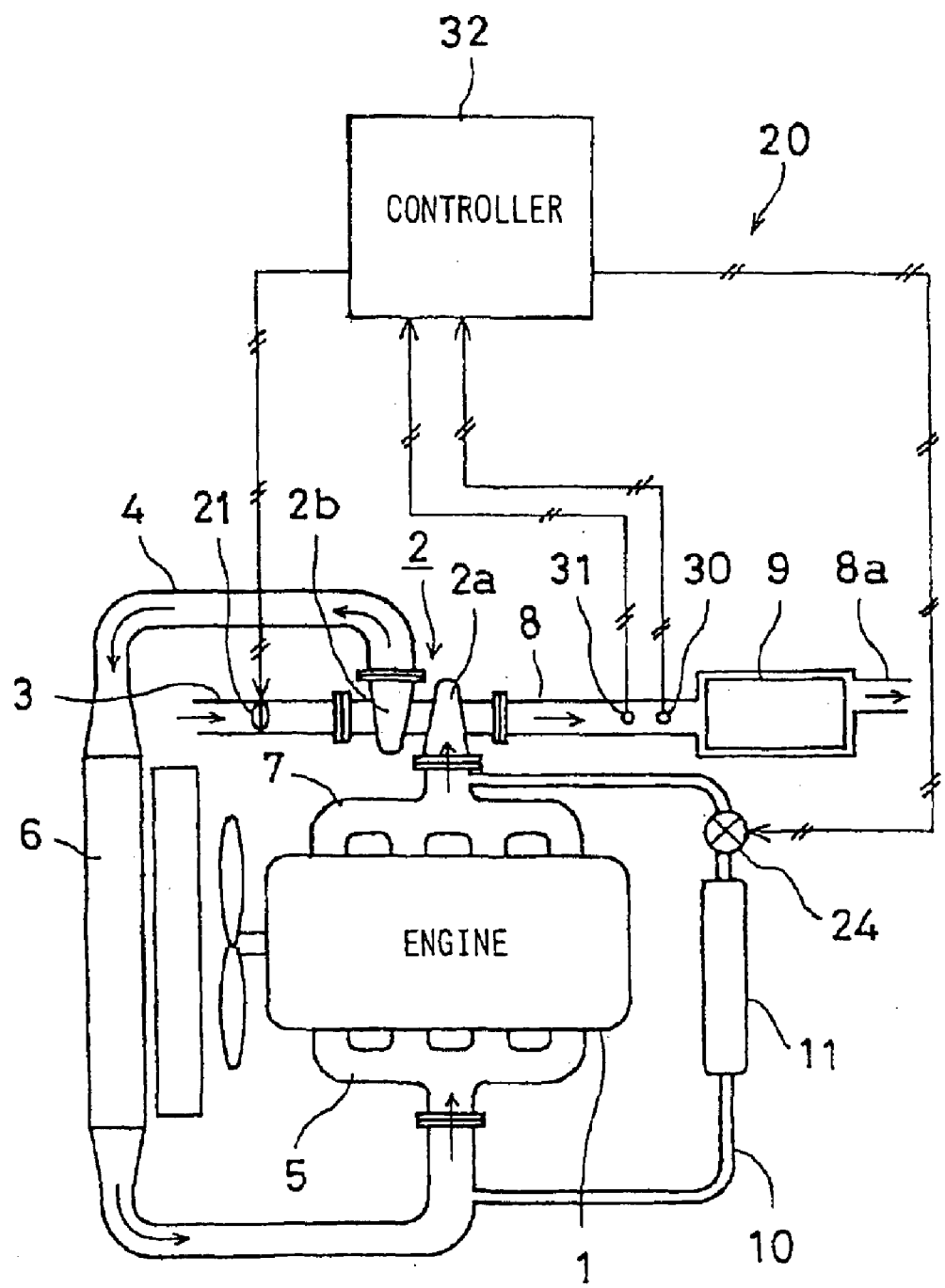
FIG. 1 is a conceptual diagram of an exhaust gas deNOx apparatus for an engine of a first embodiment of the present invention.

FIG. 1 is a conceptual diagram of an exhaust gas deNOx apparatus of a first embodiment. An engine 1 includes a turbocharger 2, and the turbocharger 2 is constituted by an exhaust turbine 2a and a compressor 2b. The exhaust turbine 2a is attached to an exhaust manifold 7, and an exhaust pipe 8 is attached at an exhaust port. A deNOx catalyst 9 is fitted in the exhaust pipe 8, and a tail pipe 8a is attached at an outlet port thereof. An intake pipe 3 is attached at an intake port of the compressor 2b connected to the exhaust turbine 2a, and the intake pipe 3 is provided with an intake air throttle valve 21 that can adjust an opening area of the intake pipe 3. An air supply pipe 4 is attached at an exhaust port of the compressor 2b to be connected to an intake manifold 5, and an inter cooler 6 is fitted in the air supply pipe 4.

A downstream side of the inter cooler 6 of the air supply pipe 4 and an upstream side of the exhaust turbine 2a of the exhaust manifold 7 are connected by an exhaust gas recirculating circuit 10. A recirculating circuit adjusting valve (hereinafter called an EGR valve) 24 that can adjust an opening area of the exhaust gas recirculating circuit 10 and a recirculating gas cooler 11 are fitted onto the exhaust gas recirculating circuit 10. The exhaust pipe 8 is provided with an NOx sensor 30 for detecting an amount of NOx and an $O_2$ sensor 31 for detecting an oxygen amount. A controller 32 connects the NOx sensor 30, the $O_2$ sensor 31, the intake air throttle valve 21 and the EGR valve 24. The controller 32 inputs a detection signal from each of the aforementioned sensors and outputs a control signal to the intake air throttle valve 21 and the EGR valve 24 after performing predetermined computation, thus constituting exhaust gas recirculating amount control means 20.

Here, the NOx sensor 30 for detecting a NOx amount has the constitution including a detecting member for detecting a NOx content and a measuring member for measuring an exhaust gas flow rate. Accordingly, the NOx sensor 30 can detect an NOx amount by performing calculation in the controller 32 based on the NOx concentration and the exhaust gas flow rate. It should be noted that the NOx sensor 30 may include only the NOx concentration detecting member. In this case, the exhaust gas flow rate is obtained according to an ordinary calculation method based on an operation condition of the engine 1 or the like. The $O_2$ sensor 31 for detecting an oxygen amount has the constitution including a detecting member for detecting oxygen content and a measuring member for measuring an exhaust gas flow rate. Accordingly, it can detect an oxygen amount by performing calculation in the controller 32 based on the oxygen concentration and the exhaust gas flow rate. It should be noted that the $O_2$ sensor 31 may include only the oxygen concentration detecting member. In this case, the exhaust gas flow rate is obtained from exhaust gas flow rate measurement date of the NOx sensor 30, or an ordinary calculation method based on an operation condition of the engine 1. The NOx sensor 30 is an example of the "NOx amount detection means" for detecting an NOx amount, and a constitution of a tenth embodiment that will be described later may be suitable as the NOx amount detection means.

An operation of the engine 1 will be explained below. The compressor 2b takes in intake air from the intake pipe 3 when driven with the exhaust turbine 2a, and the compressed supply air is fed by pressure to the intake manifold 5 via the air supply pipe 4. The supply air compressed during that time is cooled by the inter cooler 6 and is supplied in high density to the intake manifold 5 of the engine 1. Combustion takes place in the engine 1, and discharged exhaust gas is fed from the exhaust manifold 7 to the exhaust turbine 2a to drive it. Thereafter, it passes through the NOx adsorber catalyst 9 from the exhaust pipe 8, and is discharged to an outside via the tail pipe 8a. During a normal operation, operation is performed with supply air in a lean state, but in the present invention, a predetermined amount (for example, 10% to 15% of the exhaust gas amount) of exhaust gas is always recirculated to reduce NOx in the exhaust gas.

During a normal operation, discharged NOx is adsorbed in the NOx adsorber catalyst 9. When NOx accumulation amount in the NOx adsorber catalyst 9 reaches a predetermined amount, an air fuel ratio of the exhaust gas is made rich, whereby NOx is released from the NOx adsorber catalyst 9 and reduced. When the air fuel ratio of the exhaust gas is to be made rich, the controller 32 inputs a detection signal from the NOx sensor 30 and performs predetermined computation. After performing the computation, the controller 32 outputs a control signal to the intake air throttle valve 21 and the EGR valve 24 to throttle back the intake air throttle valve 21 and open the EGR valve 24. The amount of the exhaust gas recirculated at this time is, for example, 50% to 75% of the exhaust gas amount. As a result, combustion is carried out in the engine in a state near a theoretical mixture ratio, and the NOx adsorber catalyst 9 releases NOx and converts it.

Figure 2:
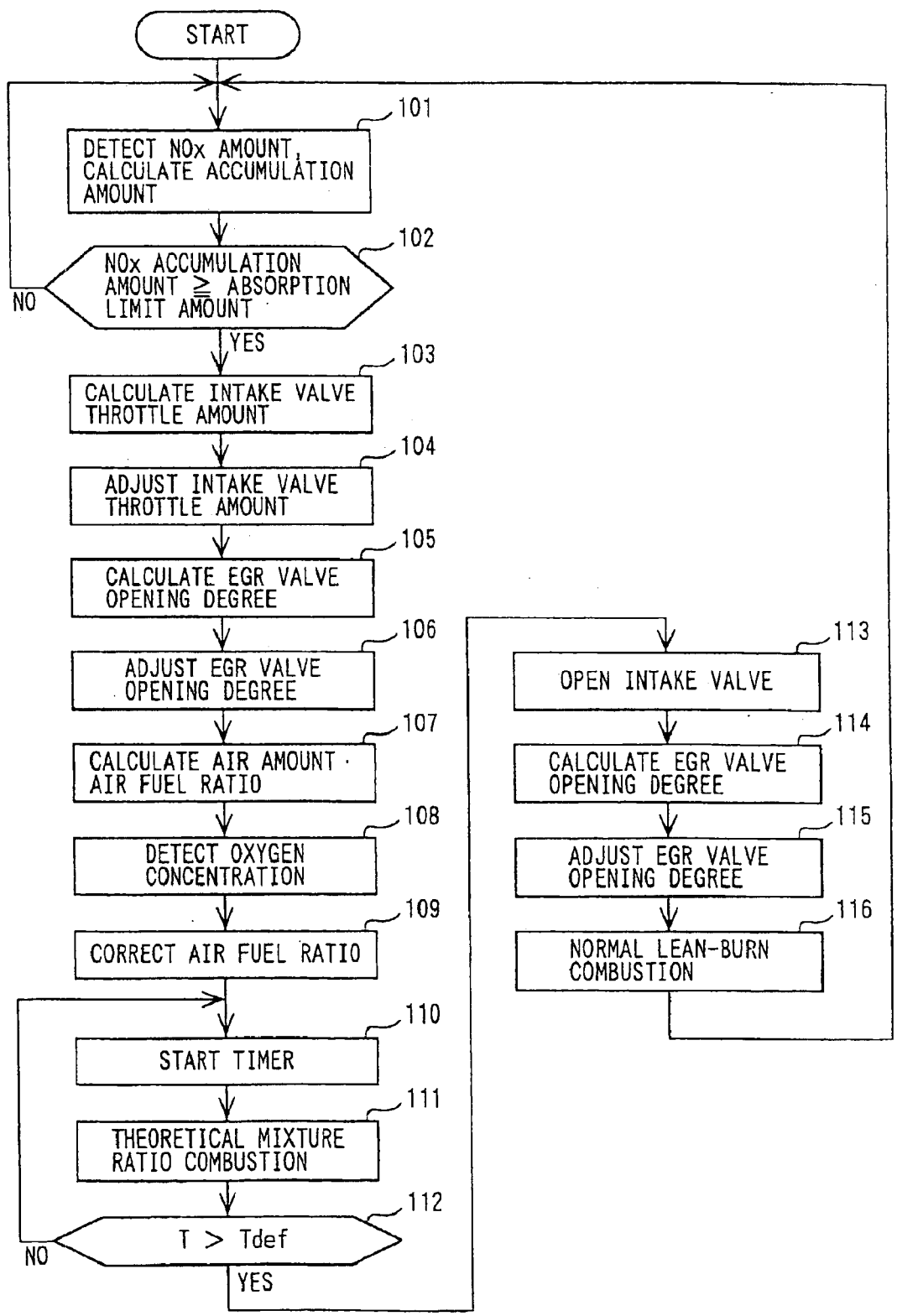
FIG. 2 is a flowchart of a deNOx operation process of the exhaust gas deNOx apparatus of the first embodiment.

An exhaust gas deNOx operation process in the first embodiment will be described in detail below based on a flowchart shown in FIG. 2.

In step 101, the NOx sensor 30 detects the NOx amount, and based thereon, the controller 32 calculates the NOx accumulation amount in the NOx adsorber catalyst 9. In step 102, the controller 32 determines whether or not the NOx accumulation amount reaches an absorption limit amount of the NOx adsorber catalyst 9, and in the case of NO, a command is given to return to the situation before step 101. In the case of YES in step 102, the controller 32 calculates a throttling amount of the intake air throttle valve 21 necessary to make the air fuel ratio of the exhaust gas rich in step 103. In step 104, the controller 32 outputs a control signal to the intake air throttle valve 21 and adjusts the throttling amount based on the calculated value.

In step 105, the controller 32 calculates degree of opening of the EGR valve 24 to make the air fuel ratio of the exhaust gas rich. In step 106, the controller 32 outputs a control signal to the EGR valve 24 and adjusts the degree of opening based on the calculated value. In step 107, the controller 32 calculates an amount of air and the air fuel ratio. In step 108, $O_2$ sensor 31 detects oxygen concentration and outputs the detected value to the controller 32. In step 109, the controller 32 corrects the air fuel ratio. In step 110, a timer that is set at an exhaust gas recirculating time Tdef necessary to reduce NOx completely, which is previously specified, is started. In step 111, the engine performs combustion at a theoretical mixture ratio.

In step 112, the controller 32 determines whether or not the exhaust gas recirculating time T exceeds Tdef or not, and in the case of NO, it gives a command to return to the situation before step 110. In the case of YES in step 112, the controller 32 opens the intake air throttle valve 21 to make the air fuel ratio of the exhaust gas lean in step 113. In step 114, the controller 32 calculates degree of opening of the EGR valve 24 necessary to recirculate a predetermined amount of exhaust gas (for example, 10% to 15% of the amount of the exhaust gas) in the state of a lean air fuel ratio. In step 115, the controller 32 outputs a control signal to the EGR valve 24, and adjusts the degree of opening based on the calculated value. In step 116, the engine performs normal lean-burn combustion (a predetermined amount of exhaust recirculation is carried out), and a command is given to return to the situation before step 101.

Since the exhaust deNOx apparatus of the first embodiment has the constitution and operational method as described in the above, the following effects are obtained.

The EGR valve 24 is always adjusted to have an area enough to recirculate a small amount of exhaust gas (for example, 10% to 15%) being opened in an ordinary lean-burn state. Thus, the discharge amount of NOx is reduced. Accordingly, the NOx adsorber catalyst 9 can be made small, the engine can be made compact, and the cost can be reduced.

When the NOx absorption amount in the NOx adsorber catalyst 9 increases and reaches the limit and the air fuel ratio of the exhaust gas needs to be made rich, the opening area of the intake air throttle valve 21 is reduced, and the degree of opening of the EGR valve 24 is increased. Thus, the amount of intake air is reduced, the inner pressure of the air supply pipe 4 is reduced, and a large amount (for example, 50% to 75% of the amount of exhaust gas) of recirculating gas flows into the air supply pipe, whereby the air fuel ratio of the exhaust gas can be made rich. Specifically, the air fuel ratio of the exhaust gas is made rich with recirculating gas, and release and reduction of NOx are performed, thus causing no excessive rise in the inner pressure of the cylinders or in the exhaust gas temperature, whereby reliability and durability of the engine are not impaired.

Figure 3:
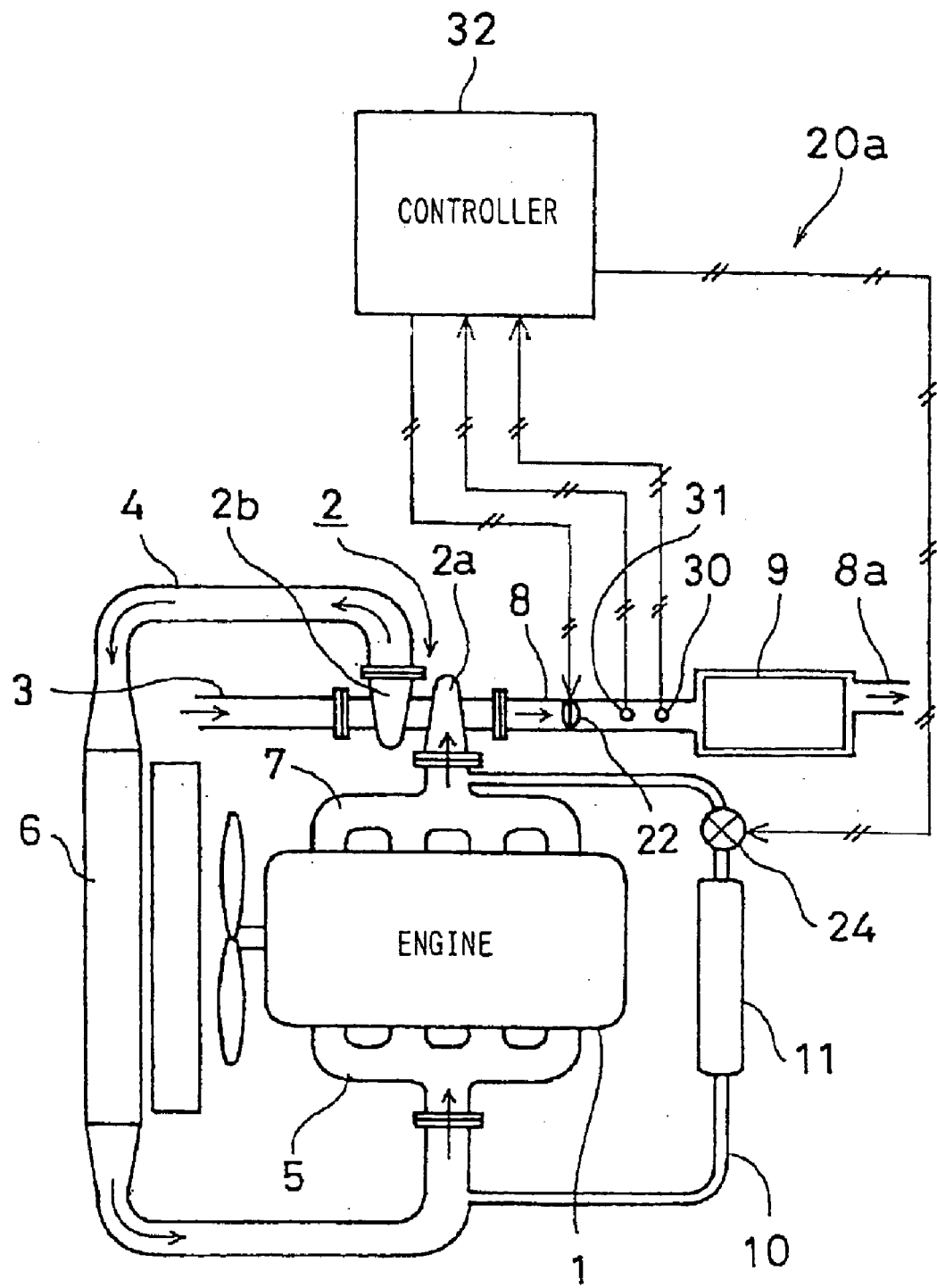
FIG. 3 is a conceptual diagram of an exhaust gas deNOx apparatus for an engine of a second embodiment of the present invention.

FIG. 3 is a conceptual diagram of an exhaust gas deNOx apparatus of a second embodiment. The same components as in the first embodiment are given the same numerals and symbols, the explanation thereof will be omitted, and only the parts different therefrom will be explained. In FIG. 3, in the second embodiment, instead of the intake air throttle valve 21, the exhaust pipe 8 is provided with an exhaust gas throttle valve 22, which is connected to the controller 32 to constitute exhaust gas recirculating amount control means 20a. When the air fuel ratio of the exhaust gas is made rich, the controller 32 outputs a control signal to throttle back the exhaust gas throttle valve 22 and open the EGR valve. As a result, the pressure on the exhaust side rises, and the difference from the air supply pressure is increased. The operation and effects are the same as the first embodiment, and therefore the explanation will be omitted.

Figure 4:
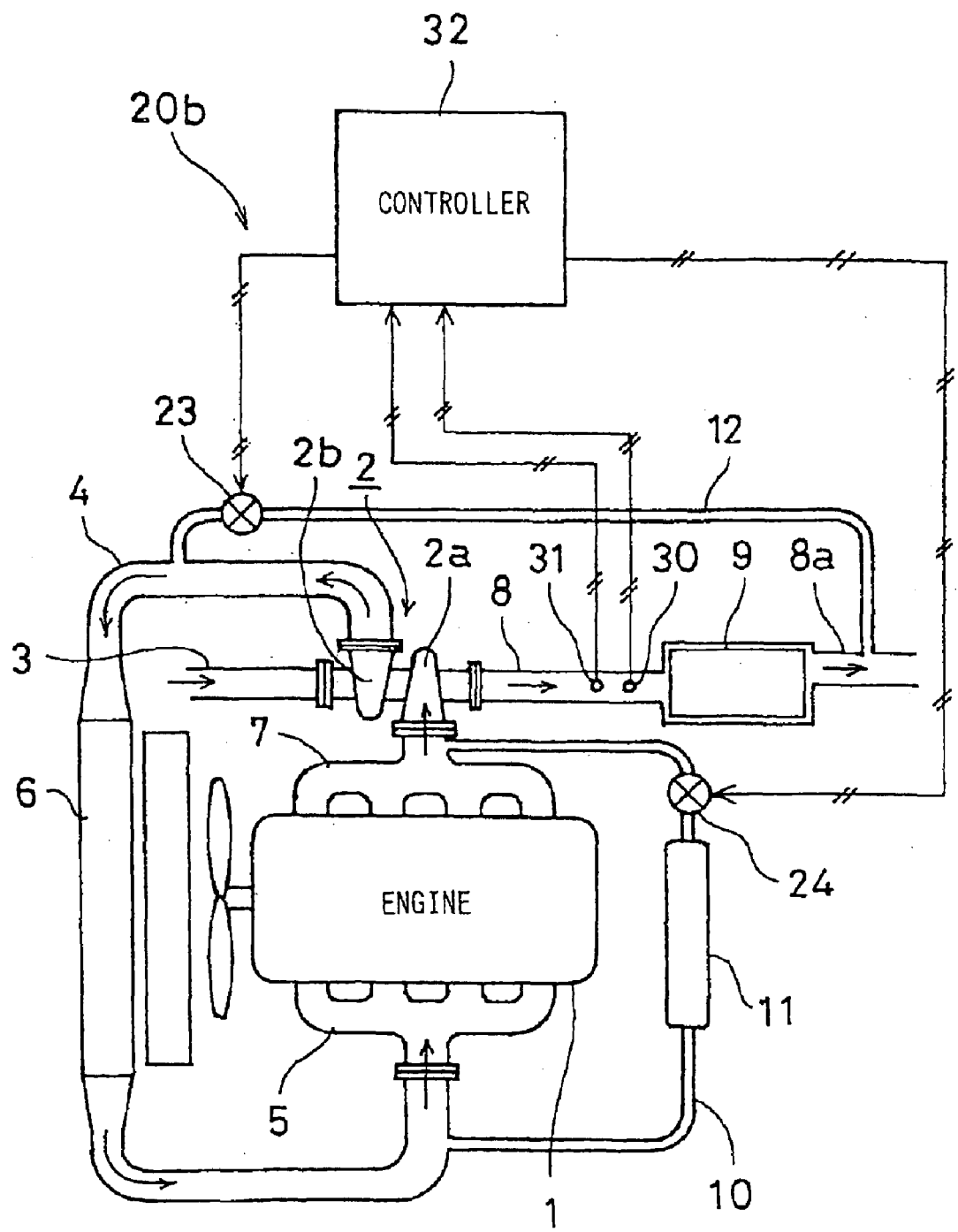
FIG. 4 is a conceptual diagram of an exhaust gas deNOx apparatus for an engine of a third embodiment of the present invention.

FIG. 4 is a conceptual diagram of an exhaust gas deNOx apparatus of a third embodiment. The same components as in the first embodiment are given the same numerals and symbols, the explanation thereof will be Omitted, and only the parts different therefrom will be explained. In FIG. 4, the intake air throttle valve 21 is eliminated in the third embodiment, but the air supply pipe 4 and the tail pipe 8a are connected by an air bleed pipe 12, and the air bleed pipe 12 is provided with an air bleed valve 23. The air bleed valve 23 is connected to the controller 32 to constitute exhaust gas recirculating amount control means 20b. When the exhaust gas is made rich, the controller 32 outputs a control signal to open the air bleed valve 23 to release part of the supply air outside. As a result, the amount of air supply is decreased and the exhaust gas becomes rich, thus making it possible to sufficiently reduce the air supply pressure as compared with the exhaust gas pressure and recirculate a large quantity of exhaust gas.

Figure 5:
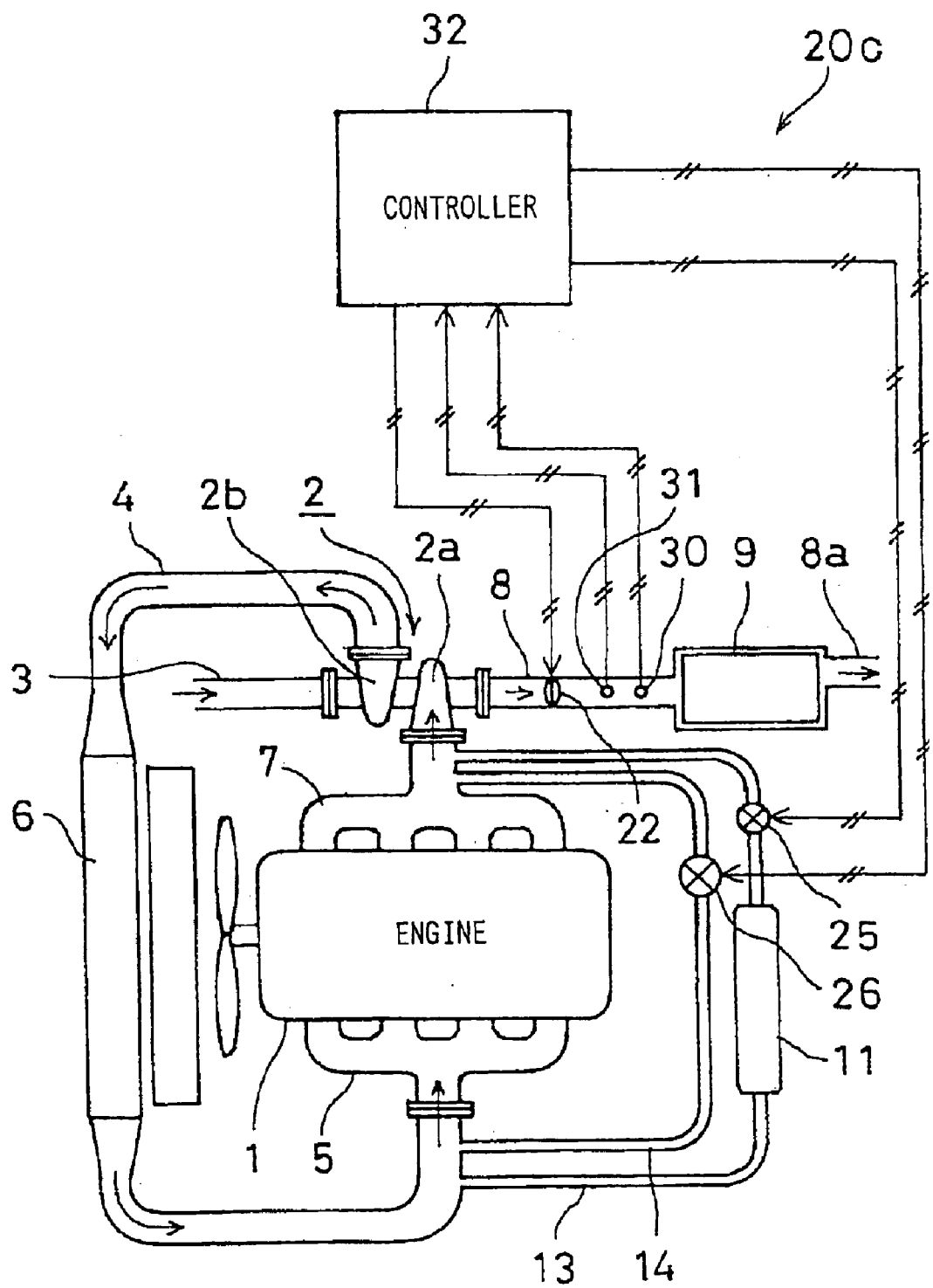
FIG. 5 is a conceptual diagram of an exhaust gas deNOx apparatus for an engine of a fourth embodiment of the present invention.

FIG. 5 is a conceptual diagram of an exhaust gas deNOx apparatus of a fourth embodiment. The same components as in the second embodiment are given the same numerals and symbols, the explanation thereof will be omitted, and only the parts different therefrom will be explained. In FIG. 5, a second exhaust gas recirculating circuit 14 with a larger passage area is provided in parallel with a first exhaust gas recirculating circuit 13 with a smaller passage area. The first exhaust gas recirculating circuit 13 is provided with a small-sized first recirculating circuit adjusting valve (hereinafter, called a first EGR valve) 25, and a large-sized second recirculating circuit adjusting valve (hereinafter, called a second EGR valve) 26 is fitted in the second exhaust gas recirculating circuit 14, which are connected to the controller 32 to constitute exhaust gas recirculating amount control means 20c. During a normal lean-burn operation, the controller 32 outputs a control signal to close the second EGR valve 26 and open the first EGR valve 25 a little to recirculate a small amount of exhaust gas as describe above. On this occasion, since the first EGR valve 25 is compact, fine adjustment is facilitated, thus making it possible to improve performance. When the air fuel ratio of the exhaust gas is to be made rich, the controller 32 outputs a control signal to open the second EGR valve to recirculate a large amount of exhaust gas. Since the second EGR valve 26 may be an ON-OFF valve, the constitution becomes simple. Further, since the passage area of the second exhaust gas recirculating circuit 14 is large, resistance is very small, thus making it possible to smoothly recirculate a large amount of exhaust gas.

Figure 9:
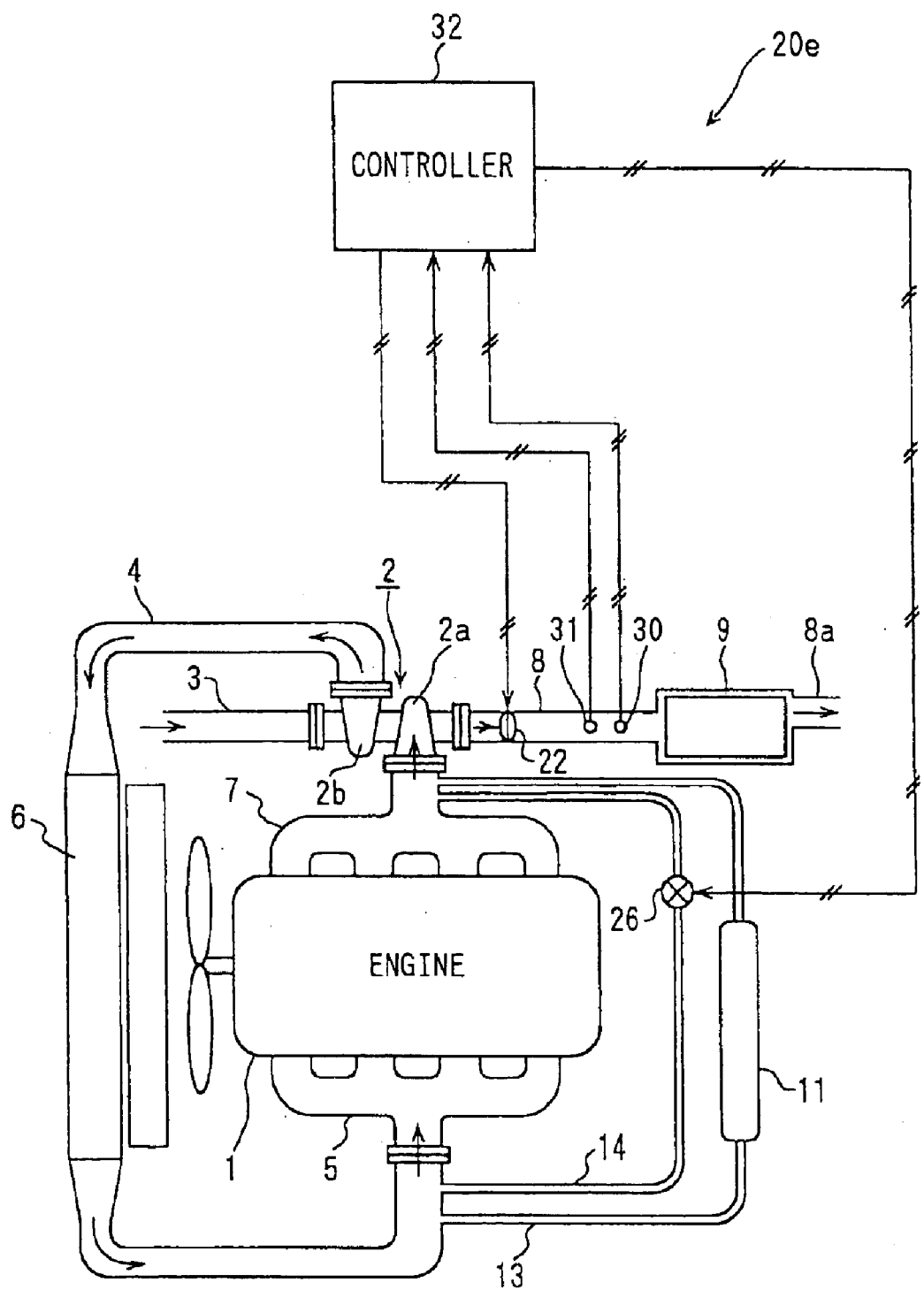
FIG. 9 is a conceptual diagram of an exhaust gas deNOx apparatus for an engine of a modification example of the fourth embodiment.

Though FIG. 5 shows an example in which the first EGR valve 25 and the second EGR valve 26 are fitted, but the first EGR valve 25 of the exhaust gas recirculating amount control means 20c may be omitted to make it exhaust gas recirculating amount control means 20e as shown in FIG. 9. In the case of this exhaust gas recirculating amount control means 20e, the controller 32 outputs a control signal during a normal lean-burn operation to close the second EGR valve 26 and recirculate a small amount of exhaust gas only in the first exhaust gas recirculating circuit 13. On the other hand, when the air fuel ratio of the exhaust gas is made rich, the controller 32 outputs a control signal to open the second EGR valve 26, whereby a large amount of exhaust gas can be recirculated by means of the second exhaust gas recirculating circuit 14 with a large passage area and the first exhaust gas recirculating circuit 13.

Figure 6:
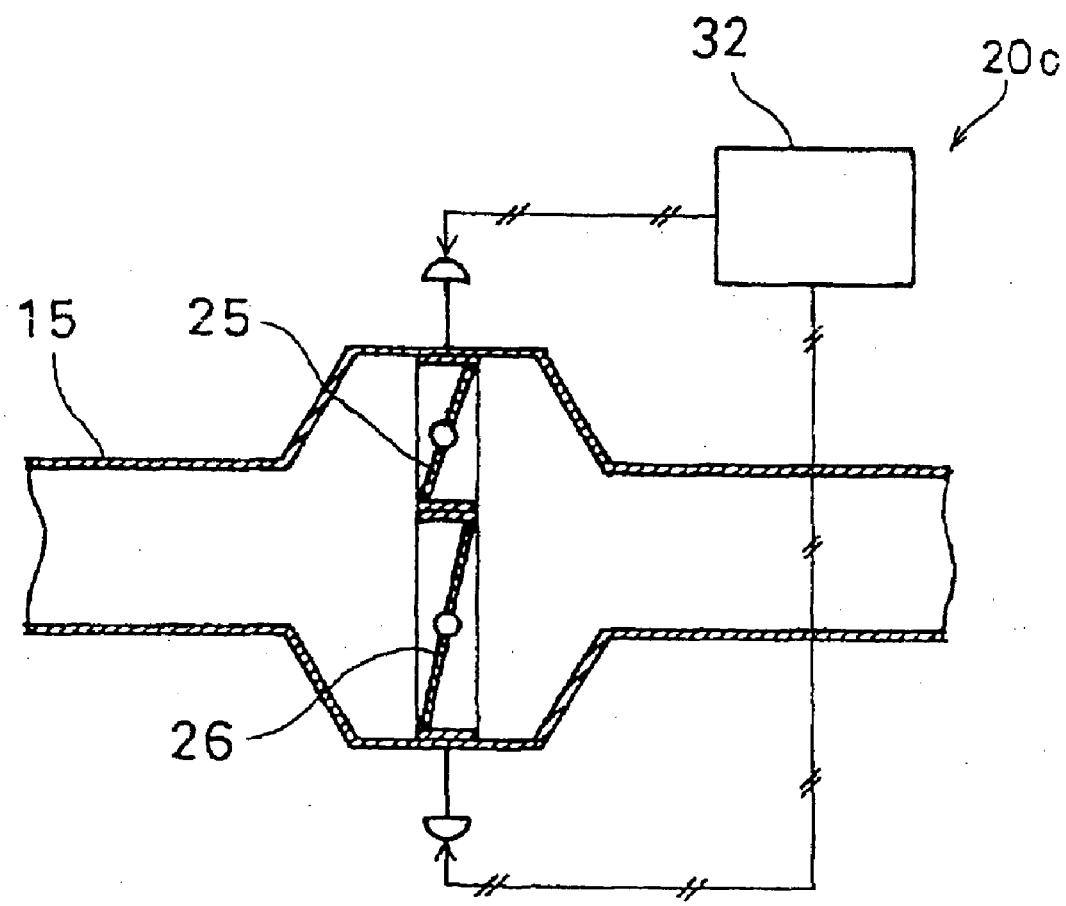
FIG. 6 is a conceptual diagram of an exhaust gas deNOx apparatus for an engine of a fifth embodiment of the present invention.

FIG. 6 is a conceptual diagram of an exhaust gas deNOx apparatus of a fifth embodiment, which shows a constitution of an EGR valve part. Specifically, the two exhaust gas recirculating circuits being the first exhaust gas recirculating circuit 13 and the second exhaust gas recirculating circuit 14 in the fourth embodiment are replaced with one third exhaust gas recirculating circuit 15 with a large passage area. A first EGR valve 25 with a small diameter and a second EGR valve 26 with a large diameter are provided in parallel inside the third exhaust gas recirculating circuit 15 and are respectively connected to the controller 32. Further, the recirculating gas cooler 11 in the fourth embodiment is omitted, but it may be provided as necessary. In the case of an ordinary lean-burn operation, the second EGR valve 26 is closed and the first EGR valve 25 is opened to finely adjust the circuit area, and when the air fuel ratio of the exhaust gas is to be made rich, the second EGR valve 26 is opened. Since the apparatus in the fifth embodiment has only one exhaust gas recirculating circuit, the constitution is simple and compact, thus making it possible to reduce the cost.

Figure 7:
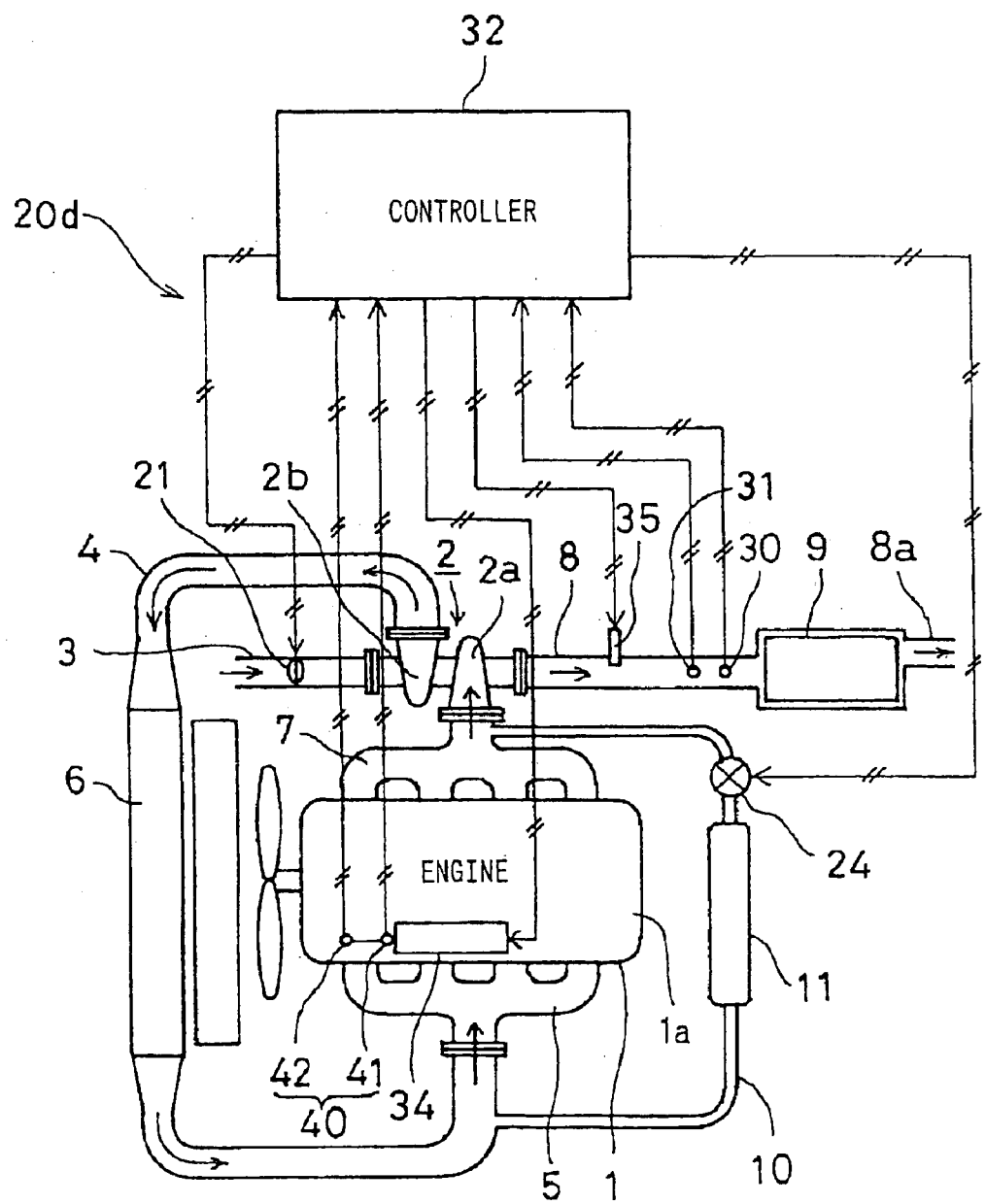
FIG. 7 is a conceptual diagram of an exhaust gas deNOx apparatus for an engine of a sixth embodiment of the present invention.

FIG. 7 is a conceptual diagram of an exhaust deNOx apparatus of a sixth embodiment. The same components as in the first embodiment are given the same numerals and symbols, the explanation thereof will be omitted, and only the parts different therefrom will be explained. A fuel injection pump 34 of the engine 1 is provided with a fuel injection amount sensor 41 and an engine speed sensor 42, which are connected respectively to the controller 32 to constitute load detection means 40. Further, a fuel injection nozzle 35 is attached to the exhaust pipe 8, and the fuel injection pump 34 and the fuel injection nozzle 35 are connected to the controller 32 to constitute the fuel supply means, and the intake air throttle valve 21 and the EGR valve 24 are added to constitute exhaust gas recirculating amount control means 20d. When the air fuel ratio of the exhaust gas is to be made rich, the intake air throttle valve 21 is closed by a predetermined amount, and the EGR valve 24 is opened to perform exhaust gas recirculation. At the same time, as an adjustment amount for providing the air fuel ratio that makes it possible to release and reduce NOx, the controller 32 outputs a control signal to increase an injection amount of the fuel injection pump 34 and inject fuel into the exhaust pipe 8 from the fuel injection nozzle 35. When the air fuel ratio is made rich by the above fuel supply means, fuel is supplied to adjust an insufficient amount. As a result, the air fuel ratio can be surely controlled to be near the theoretical air fuel ratio.

Figure 8:
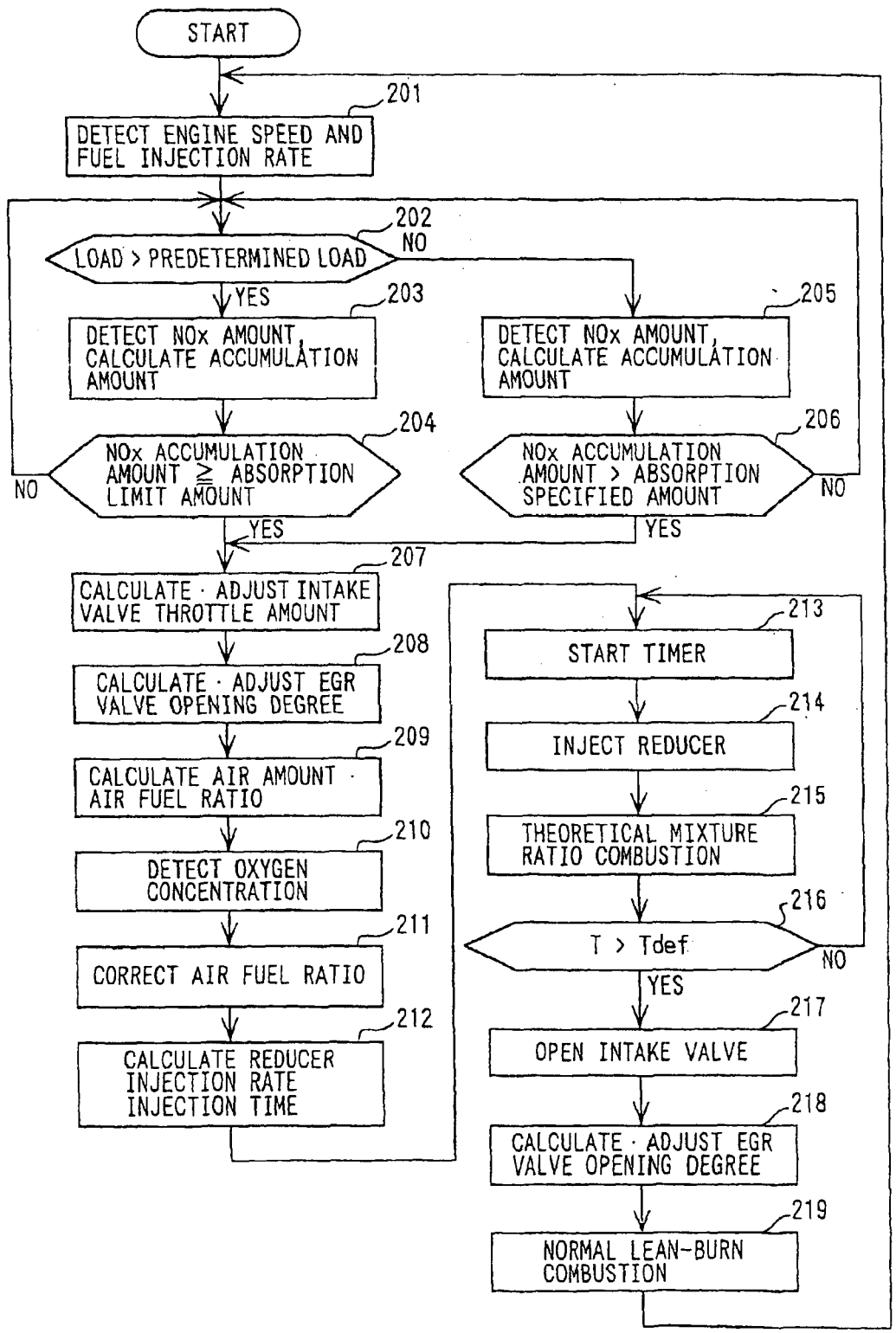
FIG. 8 is a flowchart of a deNOx process of the exhaust gas deNOx apparatus of the sixth embodiment.

An operation process of the exhaust gas deNOx apparatus of the sixth embodiment will be described in detail below based on a flowchart shown in FIG. 8.

In step 201, an engine speed and a fuel injection rate are detected by the engine speed sensor 42 and the fuel injection rate sensor 41. In step 202, the controller 32 calculates a load of the engine from the engine speed and the fuel injection rate, and determines whether the load on the engine is a predetermined load (for example, brake mean effective pressure 6 kg/cm$^2$) or higher, or not. In the case of YES in step 202, a command is given to proceed to step 203, where the NOx sensor 30 detects the NOx amount and the controller 32 calculates the NOx accumulation amount in the NOx adsorber catalyst 9. In step 204, the controller 32 determines whether the NOx accumulation amount reaches the absorption limit amount of the NOx adsorber catalyst 9, or not, and in the case of NO, a command is given to return to the situation before step 202. In the case of YES in step 204, a command is given to proceed to step 207.

In the case of NO in step 202, a command is given to proceed to step 205, where the NOx sensor 30 detects the NOx amount, and the controller 32 calculates the NOx accumulation amount of the NOx adsorber catalyst 9. In step 206, the controller 32 determines whether the NOx accumulation amount exceeds the specified absorption amount (for example, 50% to 70% of the absorption limit amount) of the NOx adsorber catalyst 9, or not, and in the case of NO, a command is given to return to the situation before step 202. In the case of YES in step 206, a command is given to proceed to step 207, where the controller 32 calculates a throttle amount of the intake air throttle valve 21 necessary to make the air fuel ratio of the exhaust gas rich, and outputs a control signal to the intake air throttle valve 21 to adjust the throttle amount.

In step 208, the controller 32 calculates the degree of opening of the EGR valve 24 necessary to make the air fuel ratio of the exhaust gas rich, and outputs a control signal to the EGR valve 24 to adjust the degree of opening. In step 209, the controller 32 calculates the amount of air and the air fuel ratio. In step 210, the O$_2$ sensor 31 detects the oxygen concentration, and outputs the detection value to the controller 32. In step 211, the controller 32 corrects the air fuel ratio. In step 212, the controller 32 calculates the injection rate of a reducer (fuel in this embodiment) and an injecting time Tdef as an adjustment amount to provide the air fuel ratio for the exhaust gas necessary to reduce the total amount of NOx.

In step 213, a timer is started. In step 214, the controller 32 outputs a control signal to the fuel injection pump 34 and the fuel injection nozzle 35, and injects fuel based on the calculated value. In step 215, the engine performs combustion in the condition near the theoretical mixture ratio. In step 216, the controller 32 determines whether a fuel injection time T exceeds Tdef or not, and in the case of NO, a command is given to the situation before step 213. In the case of YES in step 216, the controller 32 opens the intake air throttle valve 21 to make the air fuel ratio of the exhaust gas lean in step 217.

In step 218, the controller 32 calculates the degree of opening of the EGR valve necessary to recirculate a predetermined amount of exhaust gas (for example, 10% to 15% of the amount of exhaust gas) in a lean state of the air fuel ratio of the exhaust gas, and adjusts the EGR valve 24 based on the calculated value. In step 219, the engine performs normal lean-burn combustion (recirculation of a predetermined amount of exhaust gas is performed), and a command is given to return to the situation before step 201.

The exhaust gas deNOx apparatus of the sixth embodiment of the present invention has the constitution and the operation process as described above, and therefore the following effects can be obtained.

As in the first embodiment, the recirculating circuit adjusting valve 24 is always adjusted so that an area enough to recirculate a few percent of the exhaust gas amount is opened in an ordinary lean-burn state. As a result, the exhaust amount of NOx is reduced, and the NOx adsorber catalyst 9 can be made small, thus making it possible to make the engine 1 compact and reduce cost. Further, in the sixth embodiment, the fuel as an adjusting amount is designed to be injected so that the air fuel ratio of the exhaust gas becomes such an air fuel ratio as to allow NOx to be released and reduced, and therefore the air fuel ratio of supply air can be surely controlled to be close to the theoretical air fuel ratio.

Further, when the engine 1 is operated under light load, combustion at the theoretical mixture ratio is performed when the accumulation amount in the NOx adsorber catalyst 9 reaches 50% to 70% of the absorption limit amount. Since the engine 1 is under a light load, addition of the fuel can be reduced, which is economical and can prevent excessive rise in inner pressure of the cylinders 1a provided at the engine 1 and the temperature of the exhaust gas and the like. Further, the frequency of addition of fuel in a heavy load area is reduced, and reliability and durability of the engine 1 can be improved.

Though in the sixth embodiment, the added fuel is injected into the cylinders 1a and the exhaust pipe 8, but it may be suitable that fuel is injected into either the cylinders 1a or the exhaust pipe 8.

Figure 10:
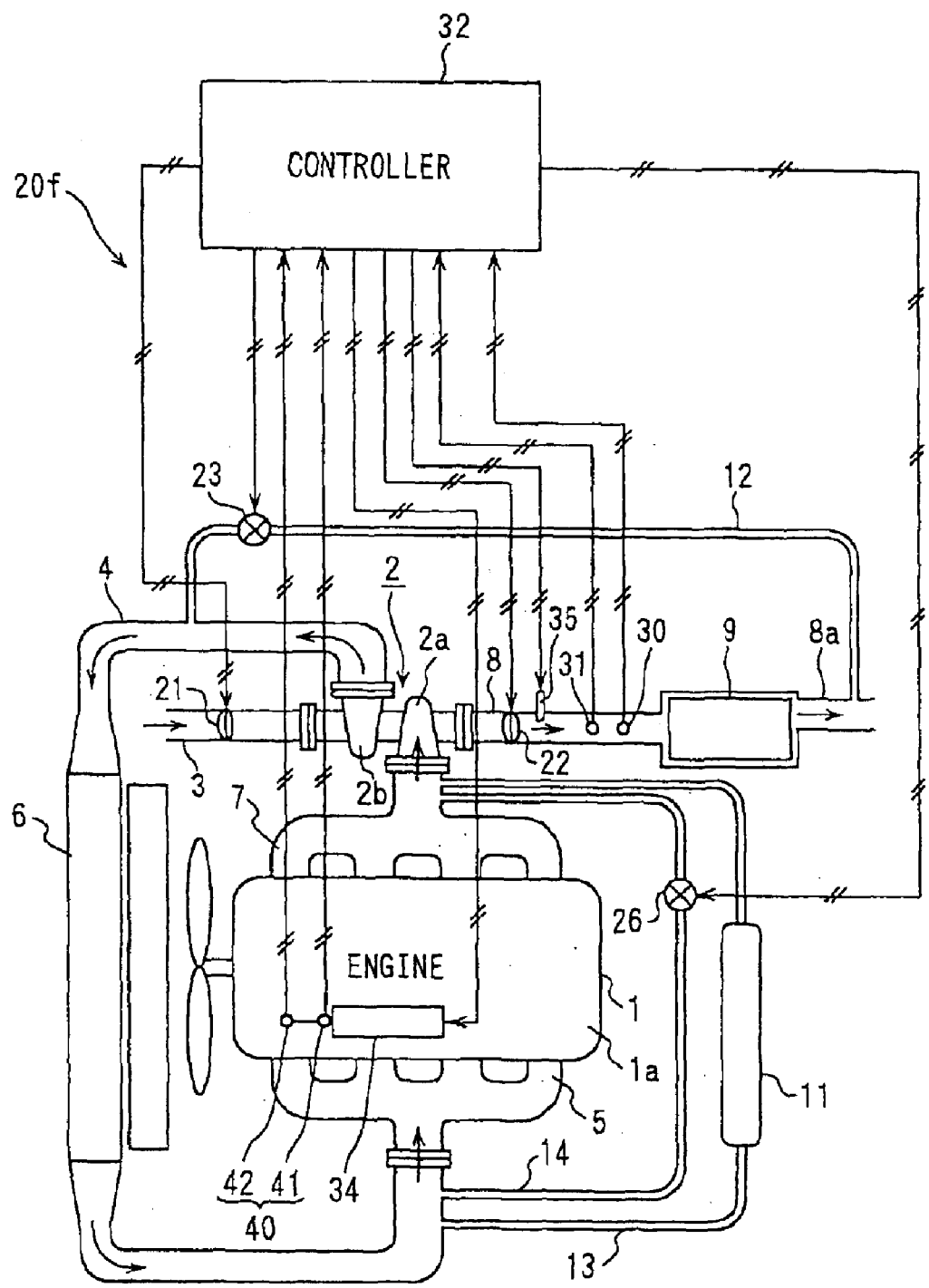
FIG. 10 is a conceptual diagram of an exhaust gas deNOx apparatus for an engine of a seventh embodiment of the present invention.

FIG. 10 is a conceptual diagram of an exhaust gas deNOx apparatus of a seventh embodiment, and is an example in which the third embodiment, a modification of the fourth embodiment and the sixth embodiment are partially combined. Specifically, as compared with FIG. 7 of the sixth embodiment, the air bleed pipe 12 connecting the air supply pipe 4 and the tail pipe 8a, and the air bleed valve 23 provided at the air bleed pipe 12 are further included and the bleed valve 23 and the controller 32 are connected, as shown in FIG. 4 (the third embodiment). Further, as compared with FIG. 7, the exhaust gas throttle valve 22 is proved at the exhaust pipe 8 and the exhaust gas throttle valve 22 is connected to the controller 32, as shown in FIG. 9 (the modification example of the fourth embodiment).

Further, as compared with FIG. 7, the exhaust gas recirculating circuit 10 for connecting the down stream side of the inter cooler 6 and the upstream side of the exhaust turbine 2a, and the EGR valve 24 fitted onto the exhaust gas recirculating circuit 10 and the recirculating gas cooler 11 are eliminated. Instead, as shown in FIG. 9, the first exhaust gas recirculating circuit 13 with a small passage area and the second exhaust gas recirculating circuit 14 with a large passage area are provided in parallel, and the recirculating gas cooler 11 is fitted onto the first exhaust gas recirculating circuit 13, while the second EGR valve 26 is fitted onto the second exhaust gas recirculating circuit 14. The NOx sensor 30, the $O_2$ sensor 31, the air bleed valve 23, the intake air throttle valve 21, the exhaust gas throttle valve 22, the aforementioned fuel supply means 33, the second EGR valve 26 and the controller 32 constitute exhaust gas recirculating amount control means 20f.

In the seventh embodiment described as above, each element of the exhaust gas recirculating amount control means 20f basically operates as described in the aforementioned third embodiment, the modification example of the fourth embodiment and the sixth embodiment. However, regarding the operation of the air bleed valve 23, the intake air throttle valve 21 and the exhaust gas throttle valve 22, only any one of them may be controlled, or both the air bleeding valve 23 and the exhaust gas throttle valve 22 may be controlled. In the seventh embodiment like this, the same operational effects as in the aforementioned corresponding embodiments can be obtained. In FIG. 10, the engine 1 includes the turbocharger 2, but when the air bleed valve 23 is not operated, the turbocharger 2 may be eliminated or may not be operated. The $O_2$ sensor 31 may be omitted if it is not necessary.

FIG. 11 is a conceptual diagram of an exhaust gas deNOx apparatus of an eighth embodiment, and is an example in which the third embodiment, the fifth embodiment and the sixth embodiment are partially combined, but it can be said to be the modification example of the seventh embodiment. Specifically, as compared with FIG. 10 of the seventh embodiment, the first exhaust gas recirculating circuit 13, the second exhaust gas recirculating circuit 14, the recirculating gas cooler 11 and the second EGR valve 26 are eliminated. Instead, the third exhaust recirculating circuit 15 with a large passage area in FIG. 6 (the fifth embodiment), the first EGR valve 25 with a small diameter and the second EGR valve 26 with a large diameter provided in parallel in the third exhaust gas recirculating circuit 15 are used. The first EGR valve 25 and the second EGR valve 26, and the controller 32 are connected. The NOx sensor 30, $O_2$ sensor 31, the air bleed valve 23, the intake air throttle valve 21, the exhaust gas throttle valve 22, the aforementioned fuel supply means 33, a plurality of EGR valves 25 and 26, and the controller 32 constitute exhaust gas recirculating amount control means 20g.

In the above eighth embodiment, similarly to the seventh embodiment, the same operational effects as in the aforementioned corresponding embodiments can be also obtained. In FIG. 11, the engine 1 includes the turbocharger 2, but when the air bleed valve 23 is not operated, the turbocharger 2 may be eliminated or may not be operated. The $O_2$ sensor 31 may be omitted if it is not necessary. Further, FIG. 11 shows the two EGR valves 25 and 26, but a plurality of EGR valves including three or more may be used. Further, the recirculating gas cooler 11 that is used in the other embodiments is omitted, but it may be provided as necessary.

Figure 12:
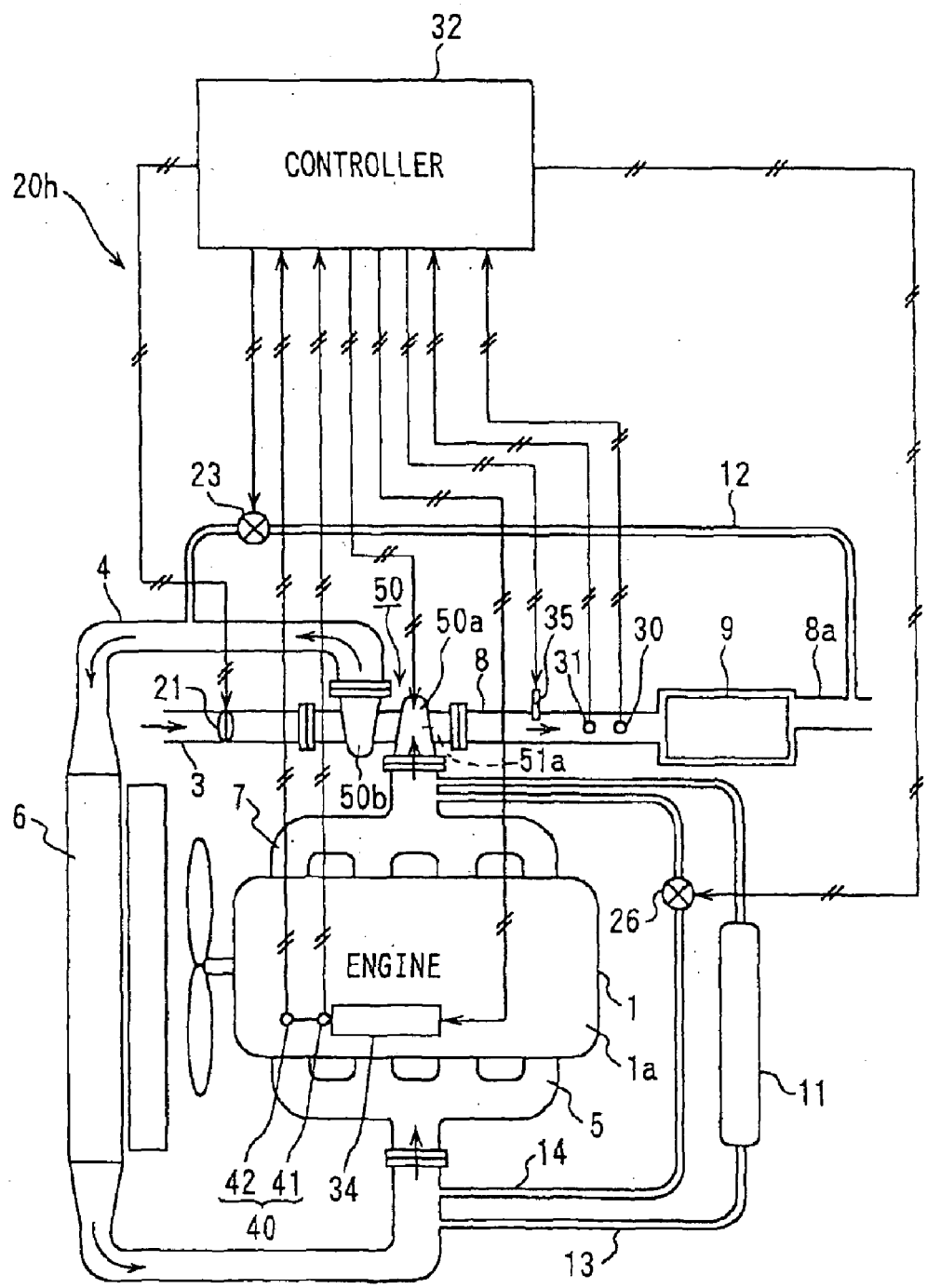
FIG. 12 is a conceptual diagram of an exhaust gas deNOx apparatus for an engine of a ninth embodiment of the present invention.

FIG. 12 is a conceptual diagram of an exhaust gas deNOx apparatus of a ninth embodiment, and is a modification example of the seventh embodiment. Specifically, as compared with FIG. 10 of the seventh embodiment, the turbocharger 2 is changed to a variable turbocharger 50, and the exhaust gas throttle valve 22 provided at the exhaust pipe 8 is eliminated. An ordinary variable turbocharger can be used as the variable turbocharger 50, which is constituted by an exhaust turbine 50a and a compressor 50b. Degree of opening of a turbine passage 51a in the exhaust turbine 50a is controlled to be variable according to a control signal from the controller 32. Specifically, exhaust gas recirculating amount control means 20h of the ninth embodiment includes the variable turbocharger 50 instead of the exhaust gas throttle valve 22 in the seventh embodiment.

According to the above constitution, by making the degree of opening of the turbine passage 51a small (for example, extremely small), exhaust gas pressure at an inlet port of the exhaust gas turbine 50a can be made higher than supply air pressure at an outlet port of the compressor 50b. When the air fuel ratio of the exhaust gas is brought to a rich state, this pressure difference between the supply air and exhaust gas is utilized, whereby a required amount of exhaust gas can be made to flow into the supply air. As a result, with use of the variable turbocharger 50, the same effects as with the exhaust gas throttle valve 22 of the seventh embodiment can be also obtained. The $O_2$ sensor 31 may be omitted if it is not necessary.

Next, a tenth embodiment will be explained. The tenth embodiment is related to another example of the "NOx amount detection means", and is applicable to the constitution including the load detection means 40 having the fuel injection rate sensor 41 and the engine speed sensor 42, and the controller 32. Specifically, the tenth embodiment is an example with the sixth embodiment (FIG. 7), the seventh embodiment (FIG. 10), the eighth embodiment (FIG. 11) and the ninth embodiment (FIG. 12) as the basis.

FIG. 13 shows relationship between the NOx amount discharged per unit horse power per unit time, the fuel injection rate (vertical axis) and the engine speed (horizontal axis), which is obtained from the engine test of the engine 1. Each curve in FIG. 13 shows the same NOx amount. In the tenth embodiment, the above FIG. 13 is stored in the controller 32 as "a map". Signals from the engine speed sensor 42 and the fuel injection rate sensor 41 are inputted, and when the engine speed and fuel injection rate at that time are known, the NOx amount discharged per unit horse power per unit time is known. In the tenth embodiment, the load detection means 40 constituted by the fuel injection amount sensor 41 and the engine speed sensor 42 and the map are made the "NOx amount detection means". Hereinafter, "the engine speed and the fuel injection amount at that time" is called an "operation point".

The controller 32 measures how many hours the engine 1 is being operated for at various operation points by means of a timer (not shown) or the like, and the NOx amount discharged as the result of the engine 1 being operated at each operation point is integrated. From the integration, the NOx amount discharged from the engine 1 is estimated as the NOx accumulation amount of the NOx adsorber catalyst 9. In the above embodiment, the same operational effects can be obtained as in the case in which the NOx sensor 30 is used. FIG. 13 is one example of a map showing the NOx amount per horse power per unit time discharged from the engine 1, and it changes depending on the various conditions such as the presence or absence of the turbocharger 2, and a fuel injection timing by the fuel injection nozzle 35.

In the above-described first, second, fourth, fifth, sixth and tenth embodiment, the engine 1 includes the turbocharger 2, but the turbocharger 2 may be eliminated.

What is claimed is:

1. An exhaust gas deNOx apparatus for an engine comprising an NOx adsorber catalyst in an exhaust pipe line of an engine, for adsorbing NOx when an air fuel ratio of an exhaust gas flowing therein is in a lean state and releasing NOx when the air fuel ratio of the exhaust gas flowing therein is in a rich state, the exhaust gas deNOx apparatus comprising:

at least one exhaust gas recirculating circuit for mixing the exhaust gas into intake air;

a plurality of recirculating circuit adjusting valves being arranged in parallel with said at least one exhaust gas recirculating circuit and operative to independently open and close each one of the adjusting valves; and exhaust gas recirculating amount control means for recirculating a predetermined amount of exhaust gas through said at least one exhaust gas recirculating circuit while maintaining one of said adjusting valves in an open position for reducing NOx when an adsorbed NOx accumulation amount is not more than a predetermined value, and for recirculating more than said predetermined amount of exhaust gas through said at least one exhaust gas recirculating circuit by opening said adjusting valves to the open position to bring the air fuel ratio into a rich state when the adsorbed NOx accumulation amount exceeds the predetermined value and the NOx is to be released.

2. The exhaust gas deNOx apparatus for an engine according to claim 1, further comprising a turbocharger provided at said engine wherein said exhaust gas recirculating circuit comprises a passage connected between an upstream side of an exhaust turbine of the turbocharger and a downstream side of a compressor of the turbocharger.

3. The exhaust gas deNOx apparatus for an engine according to claim 1, wherein said exhaust gas recirculating amount control means adjusts an exhaust gas recirculating amount, which is fed when the air fuel ratio of the exhaust gas flowing into said NOx adsorber catalyst is brought into a rich state, so that an excess air ratio is more than 1.0 and is about 1.3 or less.

4. The exhaust gas deNOx apparatus for an engine according to claim 1 or claim 3, wherein said exhaust gas recirculating amount control means comprises at least any one of an intake air throttle valve free to be opened and closed, which is provided in a pipe line of an intake pipe of said engine, and an exhaust gas throttle valve free to be opened and closed, which is provided in a pipe line of an exhaust pipe of said engine, and a controller, wherein said controller outputs a control signal for decreasing a degree of opening of either one of said intake air throttle valve or said exhaust gas throttle valve when the air fuel ratio of the exhaust gas is to be brought into a rich state.

5. The exhaust gas deNOx apparatus for an engine according to claim 1 or claim 3, wherein a turbocharger is provided at said engine, and wherein said exhaust gas recirculating amount control means comprises an air bleed valve free to be opened and closed, which is provided at an outlet port of a compressor of said turbocharger and extracts supply air to an outside, and a controller for outputting a control signal to open said air bleed valve when the air fuel ratio of the exhaust gas of said engine is to be made rich.

6. The exhaust gas deNOx apparatus for an engine according to claim 1 or claim 3, wherein said exhaust gas recirculating amount control means comprises fuel supply means for supplying fuel into at least one of cylinders of said engine and an exhaust pipe of said engine, wherein when the air fuel ratio of the exhaust gas is to be brought into a rich state, said fuel supply means supplies fuel as an adjustment amount to provide an air fuel ratio that allows said NOx adsorber catalyst to release and reduce NOx.

7. The exhaust gas deNOx apparatus for an engine according to claim 1 or claim 3, wherein said exhaust gas recirculating amount control means comprises load detection means for detecting a load of said engine; and a controller, and wherein said controller inputs a detection signal from said load detection means, and when the detected load is a predetermined value or less, it brings the air fuel ratio of the exhaust gas into a rich state.

8. The exhaust gas deNOx apparatus for an engine according to claim 1 or claim 3,
  wherein said exhaust gas recirculating amount control means comprises a variable turbocharger provided at said engine, for making a degree of opening of a turbine passage variable, and a controller, and
  wherein when the air fuel ratio of the exhaust gas is to be brought into a rich state, said controller outputs a control signal to decrease the degree of opening of said turbine passage.

9. An exhaust gas deNOx apparatus for an engine comprising an NOx adsorber catalyst in an exhaust pipe line of an engine, for adsorbing NOx when an air fuel ratio of an exhaust gas flowing therein is in a lean state and releasing NOx when the air fuel ratio of the exhaust gas flowing therein is in a rich state, the exhaust gas deNOx apparatus comprising:
  at least one exhaust gas recirculating circuit for mixing the exhaust gas into intake air; and
  exhaust gas recirculating amount control means for recirculating a predetermined amount of exhaust gas through said at least one exhaust gas recirculating circuit for reducing NOx when an adsorbed NOx accumulation amount is not more than a predetermined value, and for recirculating more than said predetermined amount of exhaust gas through said at least one exhaust gas recirculating circuit to bring the air fuel ratio into a rich state when the adsorbed NOx accumulation amount exceeds the predetermined value and the NOx is to be released; and
  a plurality of recirculating circuit adjusting valves being arranged in parallel with said at least one exhaust gas recirculating circuit and operative to independently open and close each one of the adjusting valves;
  wherein said exhaust gas recirculating amount control means comprises said plurality of recirculating circuit adjusting valves, NOx amount detection means for detecting an NOx amount, and a controller for calculating an NOx accumulation amount in said NOx adsorber catalyst based on the NOx amount outputted from said NOx amount detection means and determining whether said calculated NOx accumulation amount is a predetermined value or less, or not, and
  wherein when said calculated NOx accumulation amount exceeds a predetermined value, said controller outputs a control signal to increase a total opening area of said plurality of recirculating circuit adjusting valves to be larger than that in a lean state and makes the air fuel ratio of the exhaust gas of said engine rich.

10. The exhaust gas deNOx apparatus for an engine according to claim 9,
  wherein said exhaust gas recirculating amount control means comprises at least one of an intake air throttle valve free to be opened and closed, which is provided in a pipe line of an intake pipe of said engine, and an exhaust gas throttle valve free to be opened and closed, which is provided in a pipe line of an exhaust pipe of said engine,
  wherein said controller further outputs a control signal to decrease a degree of opening of either one of said intake air throttle valve or said exhaust gas throttle valve when the air fuel ratio of the exhaust gas is to be made rich.

11. The exhaust gas deNOx apparatus for an engine according to claim 9, further comprising:
  a turbocharger provided at said engine; and
  an air bleed valve free to be opened and closed, which is provided at an outlet port of a compressor of said turbocharger, extracts supply air to an outside, and constitutes said exhaust gas recirculating amount control means,
  wherein said controller further outputs a control signal to open said air bleed valve when the air fuel ratio of the exhaust gas of said engine is to be made rich.

12. The exhaust gas deNOx apparatus for an engine according to claim 9,
  wherein said exhaust gas recirculating amount control means comprises fuel supply means for supplying fuel into at least one of cylinders of said engine and an exhaust pipe of said engine, and
  wherein when the air fuel ratio of the exhaust gas is to be brought into a rich state, said fuel supply means supplies fuel as an adjustment amount to provide the air fuel ratio that allows said NOx adsorber catalyst to release and reduce NOx.

* * * * *